United States Patent Office 3,337,474
Patented Aug. 22, 1967

3,337,474
METHOD OF MAKING CRACKING CATALYST CONTAINING A CRYSTALLINE ALUMINO-SILICATE
Edward B. Cornelius, Swarthmore, James E. McEvoy, Morton, and George Alexander Mills, Swarthmore, Pa., assignors to Air Products and Chemicals, Inc., Philadelphia, Pa., a corporation of Delaware
No Drawing. Filed Feb. 20, 1964, Ser. No. 346,091
4 Claims. (Cl. 252—455)

This invention relates to the manufacture of cracking catalyst and primarily to the production of cracking catalyst containing material derived from a molecular sieve type of zeolite material.

As explained in "Molecular Sieve Catalyst in Hydrocarbon Reactions" by J. A. Rabo et al. in the Proceedings of the International Catalyst Conference, Paris, 1960, a portion of the sodium content of sodium Zeolite Y can be exchanged to provide a product conveniently designated as ammonium Zeolite Y. Ammonia is evolved during the heating of such ammonium derivative to provide a product conveniently designated either as hydrogen Zeolite Y or preferably as decationized Zeolite Y which product has effectiveness as an isomerization catalyst. Such discovery of the catalytic activity of such acidic silica-alumina was consistent with the previous knowledge that most other hydrogen zeolites and most decationized (i.e., acidic hydrogen derivatives of) silica alumina gel had measurable effectiveness as isomerization catalysts. Notwithstanding the publicity given to such Rabo et al. article, the petroleum refineries and cracking catalyst manufacturers encountered difficulty in developing a cracking catalyst featuring the hydrogen form of Zeolite Y and having the characteristics necessary for displacing commercially proven catalysts.

During the regeneration of a cracking catalyst in a refinery, steam at relatively high temperatures tends to deactivate the catalyst. Accordingly, some refineries prefer to purchase catalyst which retains activity even after an extremely severe test for steam stability, the test consisting of treatment of the catalyst for four hours at about 810° C. (about 1500° F.) in 100 percent steam and evaluating the thus steamed catalyst for cracking gas oil. Certain varieties of cracking catalyst, although initially active, fail to withstand such a steaming test at 810° C. Many previously proposed cracking catalysts, including some extensively used commercial catalysts have been deactivated by steaming at lower temperatures such as 680° C.

In accordance with the present invention, a precursor for a cracking catalyst is prepared by bonding together a clay and a zeolitic molecular sieve by a thermal treatment effective in transforming the clay into a porous sorptive carrier. Such thermal treatments also transform any ammonium zeolite to hydrogen zeolite. The thus prepared particles are transformed into useful cracking catalyst particles by treatment with an atmosphere containing from 10% to 100% steam at a temperature within the range from 700° C. for 750° C. for a period from 2 to 6 hours. Because steam treatment has sometimes been known to have a significant deactivating effect upon certain forms of silica alumina cracking catalyst, average technologists were not guided by prior literature to combine such steam treatment with other steps to achieve an advantageous combination of activity, selectivity, and stability, for a molecular sieve catalyst, particularly in view of the numerous explanations in the literature that the characteristics of hydrogen zeolites were easily destroyed by steam at elevated temperature. In preparing the precursor, a zeolitic molecular sieve is exchanged with an aqueous ammonium salt to exchange ammonium for all the readily exchanged metallic ions. The clay is carefully selected so that it contains less than 1.0% and preferably less than 0.5% iron. The clay composition should be such that the calcined product has good impact resistance as well as good sorptive and porosity characteristics. The catalyst precursor contains 80–95% such porous clay and 5–20% such component derived from demetallized zeolitic molecular sieve.

A preferred molecular sieve is Zeolite Y. Hydrogen Zeolite Y has pores which are about 13 angstroms. The ratio of silicon to aluminum in Zeolite Y is within the range from above 1.5 to about 2.5. Sodium Zeolite Y has a sodium to aluminum ratio of about one, and contains up to about 9 moles of water per $Na_2Al_2Si_5O_{14}$ unit.

Instead of Zeolite Y, interesting results (though not necessarily as advantageous as the results obtained with the preferred Zeolite Y) might be obtained by the use of the hydrogen form of any rigid (e.g., non-laminar) crystalline zeolitic molecular sieve most of the pores of which have a pore diameter greater than about 10 angstroms and less than 18 angstroms, said hydrogen zeolite containing a silicon to aluminum ratio greater than 1.5 but less than 8. Such hydrogen zeolites also inherently have a significant acidity. The sodium form of such zeolites also inherently possess a sodium to aluminum ratio within the range from 0.2 to 1.1. Zeolites are often hydrated, but it is not necessary to designate the degree of hydration to distinguish among the zeolites suitable for cracking catalyst.

When the formulas of the sodium forms of the molecular sieves are expressed as ratios of metal oxides, the generic description of those of interest to the present invention can be stated as:

$$QNa_2O:Al_2O_3:WSiO_2:XH_2O$$

in which Q is more than 0.2 but less than 1.1, W is from 2.5 to 16, and X is up to 9. The preferred Zeolite Y has values of from 0.7 to 1.1 for Q, and values of from 3 to 5 for W. Published patents indicate that Zeolite Y, which is marketed by several manufacturers, may be made by hydro-thermally crystallizing for several hours at 100° C. an aqueous system prepared from an aqueous silica sol and aqueous sodium aluminate.

It has been established that the activity of a cracking catalyst is desirably evaluated in the presence of 10% steam, and a testing procedure has been developed in which steam is employed instead of nitrogen while retaining much of the procedure and equipment of the Cat A test described in an article by J. Alexander and H. G. Shimp, page R537, National Petroleum News, Aug. 2, 1944.

The apparatus regularly used for a Cat A test includes a pre-heater tube and a catalyst case which are placed in an electrically heated vertical furnace. The catalyst case is a glass tube holding 200 milliliter of catalyst granules. The 50 ml. sample of the standard gas oil flows from a charging burette at a controlled uniform rate for 15 minutes into the pre-heater, together with steam, and the mixture of vapors flows downwardly through the pre-heater and into the bed of catalyst granules being evaluated. The effluent flows through a condenser and into a 75 ml. flask acting as a receiver for the synthetic crude. The uncondensed gases may be directed for collection in a gas bottle.

After the cracking run, the catalyst is regenerated. The apparatus includes valves permitting the burning of the coke from the catalyst and the catalytic combustion of the carbon monoxide in the effluent from the regeneration step to form carbon dioxide. All of the carbon dioxide is absorbed in soda-lime, whereby the coke content of the catalyst may be determined.

In measuring the activity index, exactly 200 ml. of catalyst granules are packed into the catalyst case. The catalyst case is fitted into the vertical furnace, and steam (preheated to about 510–520° C.) is directed through the pre-heater and catalyst while the furnace is heated. Shortly before the 10 minutes of pre-heating are completed, the initial catalyst temperature is substantially 482.2° C. (900° F.) as measured and established by thermocouples in the catalyst case. Then the 50 ml. sample of the East Texas Gas Oil (a 45–83% cut of an East Texas Crude) is allowed to flow downwardly into the pre-heater, where it vaporizes and mixes with the steam being introduced at a rate providing 10% by weight of steam per unit weight of gas oil charged. The catalyst is maintained at 482.2° C. (during the 15 minute run and 5 minute steam purge). The catalyst to oil ratio is 4 to 1 and the space rate corresponds to one volume of hydrocarbon vapor per volume of catalyst per hour.

The vapor effluent from the catalyst flows downwardly from the catalyst chamber and into a Graham type of condenser 30 cm. long. The condenser temperature is maintained as closely as possible to 15.6% (60° F.) as is the receiver.

After the sample of gas oil has been subjected to cracking in the presence of steam, the liquid in the receiver is distilled, and the distillate is separated into liquids boiling above and below 210° C. (410° F.). Thereafter the gas density may be measured and the coke is measured as previously indicated by the quantity of carbon dioxide evolved during the regeneration of the catalyst.

Other than for the use of steam instead of nitrogen, and the use of a cracking temperature of 900° F. instead of 800° F. the analytical procedure follows the general pattern of the Cat A test.

The nature of the invention is further clarified by reference to the following examples:

EXAMPLE I

A sample of ammonium Zeolite Y is prepared by subjecting a sample of sodium Zeolite Y to exchange with ammonium ion by treatment with an aqueous solution of ammonium nitrate. The thus prepared ammonium Zeolite Y contains a minor amount of sodium resistant to ion exchange. The ammonium Zeolite Y is mixed with kaolin of the type sometimes employed for the initial sulfation-extrusion step in the manufacture of kaolin cracking catalyst by desulfation at an elevated temperature. Previous literature has described certain batches of such kaolin as Georgia kaolin which has been refined to eliminate sand and water soluble salts, and having an analysis by weight as follows:

| | Percent |
|---|---|
| $SiO_2$ | 44.20 |
| $Al_2O_3$ | 40.14 |
| $Fe_2O_3$ | 0.20 |
| CaO | 0.02 |
| MgO | 0.02 |
| $TiO_2$ | 0.40 |
| Alkali metal oxides | 0.50 |
| $H_2O$ as V.M. | 14.52 |

The fact that the iron content is less than 0.5% is a desirable feature of the clay employed as a carrier for the present catalyst. Any clay containing significant amounts of oxides of nickel, iron, and cobalt (the mixture of the three oxides sometimes being designated as iron oxide because it usually predominates) tends to promote excessive deposition of coke at cracking temperatures, and hence must be avoided as a carrier for zeolitic molecular sieve material.

The proportions were such that after calcination, the solids content comprised about 85% kaolin clay and about 15% hydrogen Zeolite Y. The wet mixture was cast into pellets and then dried and calcined in bone dry air to bring about the formation of particles sufficiently rugged to be handled. The particles were activated by treatment in a stream of dry air at 560° C. for 2 hours. In the manufacture of several varieties of catalyst, a heat treatment of catalyst particles at 560° for 2 hours in air is sufficient to activate the cracking catalyst to an optimum activity. After the 15% hydrogen Zeolite Y in kaolin catalyst had been activated by heating for 2 hours in air 560° C., and cooled, it was tested to determine its performance in the previously described analytical procedure for evaluating catalyst activity.

Although calcined kaolin is more active as a cracking catalyst than sand, silica gel, or other relatively inert solids, still calcined kaolin has poor effectiveness as a cracking catalyst, even when activated at 560° C. in dry air for two hours, as indicated by the following results.

Product:
| | | |
|---|---|---|
| Gasoline | vol. percent | 18.7 |
| Coke | wt. percent | 0.7 |
| Gas | wt. percent | 3.6 |
| Conversion | wt. percent | 20.8 |
| Selectivity | wt. percent | 79.3 |
| Gas gravity | | 1.04 |

The catalyst containing 15% hydrogen zeolite and prepared as described proved to be at least as unsatisfactory as the calcined and heat activated porous kaolin particles, as indicated by the following results.

Product:
| | | |
|---|---|---|
| Gasoline | vol. percent | 16.0 |
| Coke | wt. percent | 16.0 |
| Gas | wt. percent | 20.4 |
| Conversion | wt. percent | 50.5 |
| Selectivity | | 28 |
| Gas gravity | | 0.62 |

The attempt to prepare a cracking catalyst by the careful treatment of the mixture of clay binder and zeolitic molecular sieve at 560° C. with dry air for two hours was unsuccessful, and the marginal effect contributed by the zeolitic molecular sieve did not appear to be very encouraging.

A catalyst was prepared in accordance with the present invention by the utilization of the improvement of treatment of said zeolite-clay particles with 100 percent steam at 730° C. for 4 hours. The resulting particles were evaluated by the same standard procedure. The performance of the steam activated catalyst of the present invention contrasted with the previously described control catalyst of the same composition activated by dry air at 560° C. The advantageous combination of activity, selectivity, and stability of the steam activated catalyst was evaluated at a space rate of both 1 and 3 volumes of gas oil per volume of catalyst per hours, as shown in Table A:

TABLE A.—EVALUATION OF CATALYSTS CONSISTING OF 15% ZEOLITE Y IN CLAY

| Percent Steam During Activation | Space Rate | Gaso., Vol. Percent | Coke, Wt. Percent | Gas, Wt. Percent | Gas Gravity | Selectivity, Wt. Percent | Conversion, Wt. Percent |
|---|---|---|---|---|---|---|---|
| 0 | 1 | 16.0 | 16.0 | 20.4 | 0.62 | 28 | 50.5 |
| 100 | 1 | 48.6 | 7.4 | 26.5 | 1.02 | 56 | 76.6 |
| 100 | 3 | 55.4 | 4.9 | 22.4 | 1.24 | 64 | 76.1 |

The remarkable activity and selectivity of the steamed catalyst provided the assurance that the steam activation step was of great importance in the manufacture of a clay bonded molecular sieve type of cracking catalyst. The attainment of 64% selectivity at 76.1% conversion at a 3 space rate is sufficiently outstanding to qualify the catalyst as a high activity cracking catalyst.

The catalyst preparations were repeated and the particles subjected to various steam treatments to evaluate their steam stabilities, and the results of the activity tests were as follows:

| Prep | °C. | Percent H$_2$O | Hrs. | Gaso., Vol. Percent | Conv., Wt. Percent |
|---|---|---|---|---|---|
| A | 730 | 100 | 4 | 48.6 | 76.6 |
| B | 730 | 10 | 5 | 43.2 | 85.4 |
| B | 730 | 100 | 4 | 62.9 | 82.1 |
| C | 810 | 100 | 4 | 57.6 | 70.0 |

The data indicated that the molecular sieve catalyst could withstand the extremely severe steaming test at 810° C. and hence appeared to be capable of withstanding adverse conditions in regeneration kilns.

EXAMPLE II

A silica alumina catalyst having an activity of 46 (measured by Cat A evaluation) and marketed as S-46 catalyst was once deemed the outstanding catalyst for fixed bed units. This catalyst was employed as a control to indicate the relatively superior conversion and selectivity of the catalyst of the present invention. The S-46 catalyst was shown to be seriously damaged by the severe steaming treatment shown to activate the clay supported molecular sieve catalysts.

Sodium Zeolite Y was converted to the ammonium Zeolite Y by ion exchange, and admixed with plastic kaolin, for extrusion, slicing, calcining, and steam activation at 730° C. Variables including concentrations of 7.5% and 10% hydrogen Zeolite Y derived component, 10% and 100% steam, and space rates of 1 and 3 were evaluated, as indicated in the table.

TABLE

| Sieve Inc., Percent | Activation | | SR | Vol. Percent Gasoline | Coke Wt. Percent | Gas Wt. Percent | Gas Gravity | Wt. Percent Conversion | Wt. Percent Selectivity |
|---|---|---|---|---|---|---|---|---|---|
| | Percent Steam | Hrs. | | | | | | | |
| 0[1] | 0 | 0 | 1 | 43.3 | 6.9 | 29.3 | 1.65 | 74.4 | 51 |
| 0[1] | 0 | 0 | 3 | 45.0 | 3.7 | 19.4 | 1.66 | 62.7 | 63 |
| 0[1] | 10 | 4 | 1 | 37.8 | 1.7 | 11.3 | 1.51 | 46.3 | 72 |
| 7.5 | 10 | 5 | 1 | 52.0 | 6.2 | 25.3 | 1.53 | 77.3 | 59 |
| 7.5 | 100 | 4 | 1 | 62.2 | 2.6 | 20.9 | 1.61 | 78.3 | 70 |
| 10 | 10 | 5 | 1 | 47.9 | 7.2 | 29.8 | 1.55 | 79.1 | 53 |
| 10 | 100 | 4 | 1 | 59.2 | 3.7 | 19.2 | 1.58 | 75.1 | 69 |
| 10 | 100 | 4 | 3 | 62.1 | 1.9 | 14.7 | 1.64 | 71.3 | 77 |

[1] S-46 cracking catalyst illustrating similar activity but poorer stability without sieve.

The attainment of 77% selectivity at 71.3% conversion at a 3 space rate qualifies the catalyst of the present invention as a highly active, highly selective catalyst.

The steam stability of a series of catalysts consisting of hydrogen Zeolite Y in clay, after treatment for four hours in 100% steam at selected temperatures, was established in a series of evaluation as follows:

| Prep | Percent Sieve | °C. | Gaso., Vol. Percent | Conv., Wt. Percent |
|---|---|---|---|---|
| A | 10 | 730 | 59.2 | 75.1 |
| B | 10 | 810 | 54.2 | 64.0 |
| C | 5 | 810 | 47.6 | 53.5 |
| D | 20 | 810 | 60.6 | 76.6 |

Zeolite molecular sieves can be converted into the form in which the ion of a suitable metal is exchanged for the acidic hydrogen, and such metal derivatives have previously been recommended as hydrocarbon conversion catalysts. Some of the metals which have been recommended in such hydrocarbon conversion catalysts include cerium, chromium, platinum, silver, and molybdenum. In the development of the present invention, it was discovered that the cracking catalyst containing a small amount of hydrogen zeolite had stability in 810° C. steam superior to some of the metal derivatives containing 10% such metal zeolite, conveniently designated as salt forms of zeolitic molecular sieve cracking catalysts. The four hour steaming at 810° C. induced a 49.6% reduction of the weight percent conversion using one of the salt forms of zeolitic molecular sieve cracking catalysts so that it provided only a 37.9% conversion. The volume percent gasoline was reduced from 56.2% to 34.0% (a 39.6% reduction) by such 810° C. steaming for 4 hours. Another sample of metal derivative of zeolite molecular sieve cracking catalyst produced only 31.6% gasoline after such 810° C. steaming instead of 54% (a 41.4% reduction) and provided only 35.6% conversion instead of 70.3% (a 49.4% reduction), thus indicating that such metal zeolitic samples lacked the outstanding steam stability of the cracking catalysts of the present invention.

By a series of tests, it is established that only those clays which contain no more than 1% and preferably not more than 0.5% by weight of iron (usually present as compounds of iron) can be employed as the carrier for stable cracking catalysts of the present invention. The clay should be cleaned to remove gravel, sand, and debris so that the composition of the clay employed for catalyst manufacture has a reliably known composition. By a series of tests it is established that suitable clays include halloysite, dealkalized bentonite (sometimes designated as hydrogen montmorillonite), ball clay, and kaolin. The calcined clay must have significant porosity, and not be porcelainized. Most of the satisfactory varieties of clays contain less than 0.5% fluxing agents such as oxides of lithium, sodium, and the like as well as the preferred requirement of less than 0.5% iron.

Obviously many modifications and variations of the invention as hereinbefore set forth may be made without departing from the spirit and scope thereof, and therefore only such limitations should be imposed as are indicated in the appended claims.

What is claimed is:
1. The method of making cracking catalyst particles which consists of: mixing from 4 to 19 parts by weight clay containing less than 0.5% iron with one part of an ammonium zeolitic molecular sieve material substantially free of exchangeable metal cations and having a silicon atom to aluminum atom unit ratio within the range from 1.5 to 8 and an average pore diameter within the range from 10 angstroms to 18 angstroms; forming such mixture into rugged particles containing precursors corresponding after calcination to 80–95% porous clay carrier and 5–20% hydrogen zeolite type of component derived from the zeolitic molecular sieve; and subjecting said particles to an atmosphere containing from 10% to 100% steam at a temperature within the range from 700° C. to 750° C. for a period from 2 to 6 hours.

2. The method of making a catalyst suitable for cracking high boiling hydrocarbons to lower boiling hyrocarbons which method consists essentially of the steps of preparing crystalline alkali zeolitic molecular sieve having an average pore diameter within the range from 10 to 18 angstroms and having a unit ratio of silicon atoms to aluminum atom within the range from 1.5 to 8; preparing the ammonium form of such zeolitic molecular sieve by ion exchange treatment of such alkali zeolitic molecular sieve with an aqueous solution of an ammonium salt to substantially completely replace exchangeable metal cations, thereby preparing an ammonium zeolite; cleaning mined clay to provide kaolin containing less than 0.5% iron; forming a mixture of such kaolin and such ammonium zeolite into precursor particles corresponding to calcined particles containing 5–20% hydrogen zeolite type component derived from zeolitic molecular sieve and 80–95% rugged, calcined, porous kaolin clay; calcining such formed particles; activating the calcined particles for cracking catalyst selectivity by treatment in an atmosphere containing from 10% to 100% steam for a period of from 2 to 6 hours at a tempearture from 700° C. 750° C., and cooling the thus steamed catalyst particles.

3. The method of making catalyst suitable for cracking high boiling hydrocarbons to lower boiling hydrocarbons which method consists essentially of the steps of: preparing sodium Zeolite Y; preparing the ammonium form of Zeolite Y by ion exchange treatment of sodium Zeolite Y with an aqueous solution of an ammonium salt to substantially completely replace exchangeable metal cations; cleaning mined clay to provide kaolin containing less than 0.5% iron; forming a mixture of about 90% kaolin and 10% amonium Zeolite Y into precursor particles; calcining such precursor particles; activating the calcined particles for cracking catalyst selectivity by treatment in an atmosphere containing about 100% steam for a period of about 4 hours at a temperature of about 730° C; and cooling the thus steamed catalyst particles.

4. The method of making a catalyst suitable for cracking high boiling hydrocarbons to lower boiling hydrocarbons which method consists essentially of the steps of: cleaning mined clay to provide kaolin containing less than 0.5% iron; forming a mixture consisting of from about 4 to about 19 parts by weight of such cleaned, sufficient water to permit formation into particles, and one part by weight of ammonium zeolite having an average pore diameter within the range from 10 to 18 angstroms and having a unit ratio of silicon atom to aluminum atom within the range from 1.5 to 8, said ammonium zeolite having been prepared by ion exchange of a sodium zeolite whereby the ammonium zeolite contains only a minor amount of sodium resistant to ammonium ion exchange and whereby no metallic cations other than sodium are zeolitically held; shaping said mixture of kaolin, water and ammonium zeolite into particles; heating said particles for from 2 to 6 hours at an elevated temperature above 700° C. in the presence of from 10% to 100% steam to remove ammonia and water, and to prepare calcined cracking catalyst particles containing hydrogen zeolite, said particles having an effectiveness when employed as the cracking catalyst superior to particles prepared from compositions containing ammonium zeolite having a silicon atom to aluminum atom ratio less than 1.5, superior to particles calcined at a temperature lower than 700° C., and superior to particles comprising a silica alumina carrier for the zeolitic component.

References Cited
UNITED STATES PATENTS

| | | | |
|---|---|---|---|
| 2,962,435 | 11/1960 | Fleck et al. | 208—119 |
| 2,973,327 | 2/1961 | Mitchel et al. | 252—449 |
| 3,130,006 | 4/1964 | Rabo et al. | 23—110 |
| 3,140,251 | 7/1964 | Plank et al. | 208—120 |
| 3,178,365 | 4/1965 | Miale | 208—120 |

DELBERT E. GANTZ, *Primary Examiner.*

PAUL M. COUGHLAN, A. RIMENS,
*Assistant Examiners.*